June 26, 1956
A. ANDERSON
2,752,538
MAGNETIC WORK SUPPORT
Filed Sept. 22, 1951
2 Sheets-Sheet 1
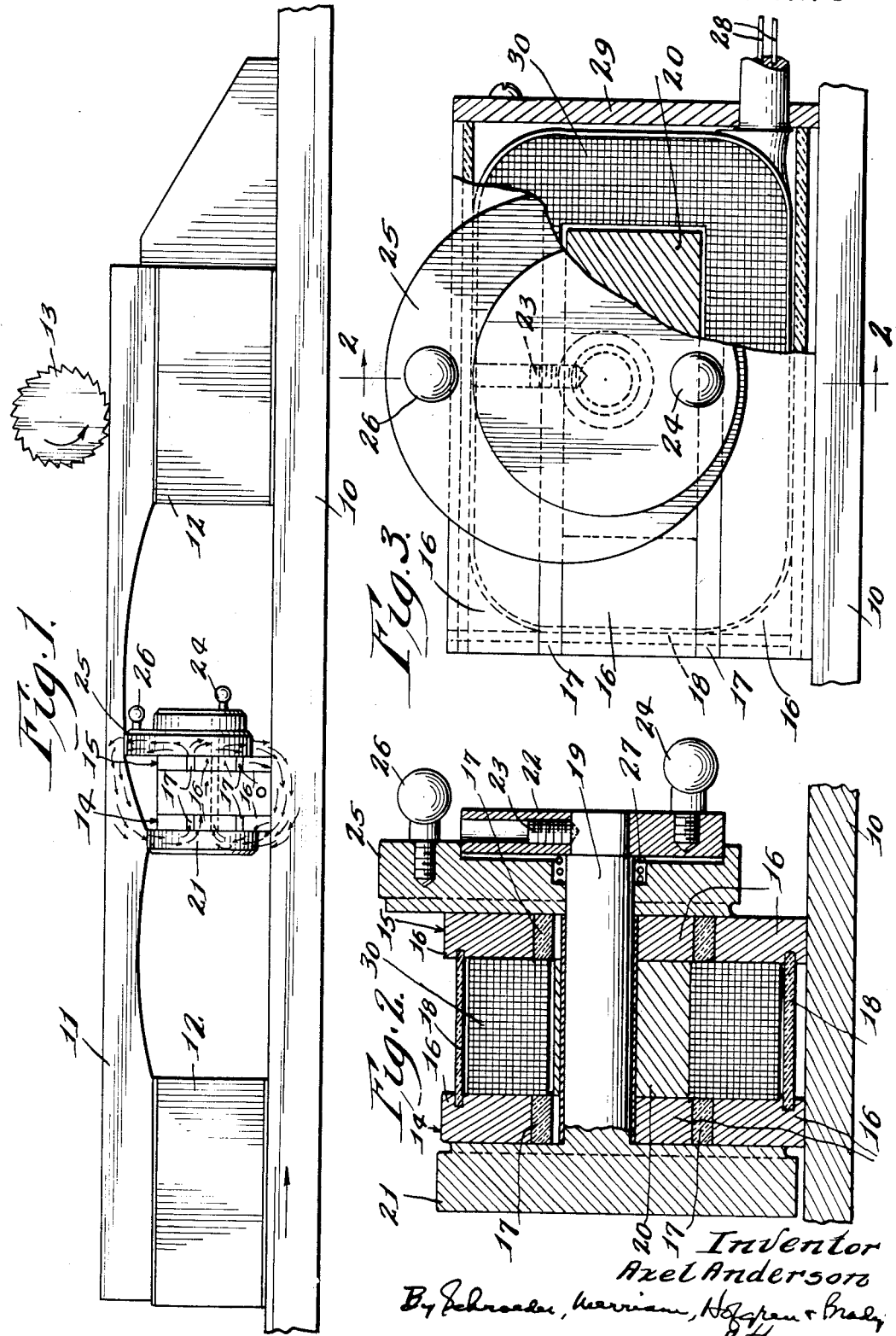
Inventor
Axel Anderson
By Schroeder, Merriam, Hofgren & Brady
Attorneys

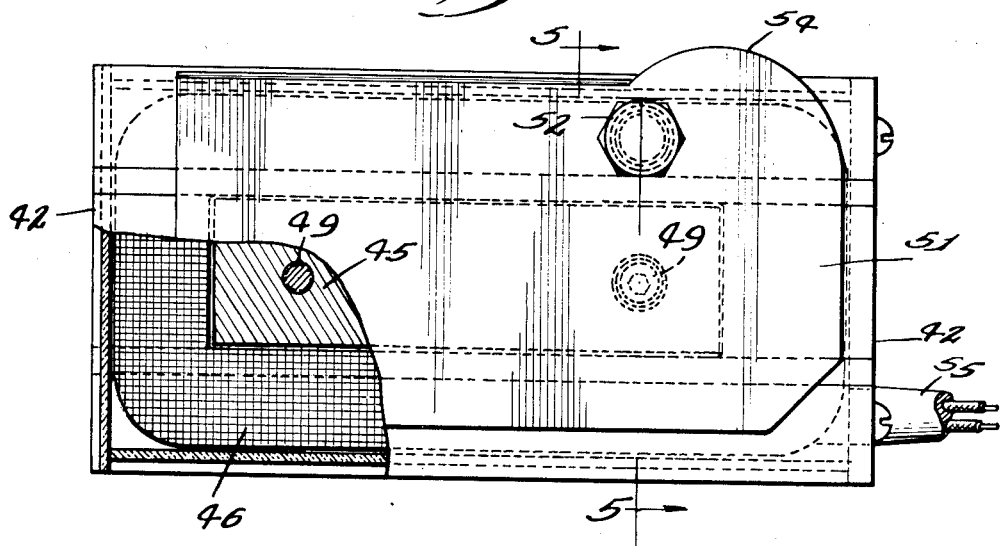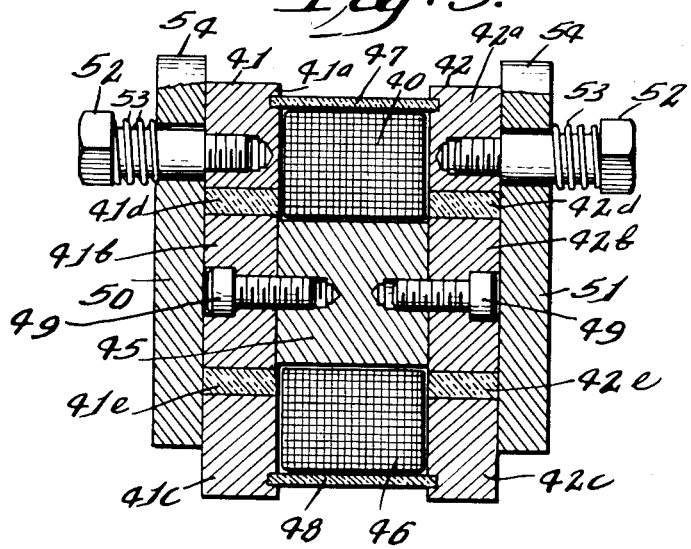

United States Patent Office 2,752,538
Patented June 26, 1956

2,752,538
MAGNETIC WORK SUPPORT

Axel Anderson, Rockford, Ill., assignor to Sundstrand Magnetic Products Co., a corporation of Illinois Application September 22, 1951, Serial No. 247,893

5 Claims. (Cl. 317—163)

This invention relates to a magnetic work support or jack for supporting work pieces undergoing a machining operation. More particularly the invention relates to a work support which may be adjusted in height and held in an adjusted position by electromagnetism.

During a machining operation on a machine tool such as a milling machine, a work piece is held in position on a moving table while it is acted upon by a cutting tool. During this operation the work piece is subjected to considerable stress. Where the work piece is long and thin and has an unsupported surface which it is desired to cut, there is danger that the stress to which the work piece is subjected during cutting will deform it. In order to minimize the likelihood of such an occurrence, it is desirable to place some kind of a support under portions of the work piece which would otherwise be unsupported.

It is an object of this invention to provide an adjustable work support or jack which may be quickly and conveniently positioned in a manner to support a work piece.

Another object of this invention is to provide a work support or jack which utilizes electromagnetism to hold the work and to hold itself in position on a machine table or other part after being set up.

A still further object is to produce a work support having two independently adjustable members for supporting work pieces.

Another object is to provide a work support having two independently adjustable members for supporting a work piece, both of which members may be controlled from the same side of the device.

Other objects of this invention will be apparent as the description of the illustrated embodiment proceeds taken in conjunction with the accompanying drawing in which:

Fig. 1 is a fragmentary elevational view of the work table of a milling machine with a preferred form of the invention in position thereon supporting a work piece. The magnetic flux lines which lock the support in position are shown in dotted lines;

Fig. 2 is a sectional elevation through the preferred form of the invention taken along the line 2—2 of Fig. 3;

Fig. 3 is an end view of the work support partly in section;

Fig. 4 is an end view of a modified form of the work support partly in section; and Fig. 5 is a vertical section through the modified form taken along the line 5—5 of Fig. 4.

While there is shown in the drawing and hereinafter described in detail a preferred form of the invention, it is to be understood that the invention is not limited to the particular form and arrangement shown. It is contemplated that various changes may be made by those skilled in the art without departing from the spirit and scope of the appended claims.

In Fig. 1 a preferred form of work support is positioned on a machine table 10 which may be part of a milling machine or other machine tool. A long, thin work piece 11 is supported at its ends by a pair of fixtures or magnetic chucks 12. A milling cutter 13 is shown making a cut on the work piece 11.

If the sole support of the work piece 11 were the fixtures 12, it may be seen that a considerable part of the work piece would be subjected to a deforming stress as the milling cutter passed thereover. The work support or jack of this invention not only obviates this danger but has two supporting members which are independently adjustable to allow for support of an uneven work piece.

Referring particularly to Figs. 2 and 3, the jack has a frame comprising two parallel end plates 14 and 15. The end plates 14 and 15 are composed of horizontally extending strips 16 of a material having good magnetic permeability separated by strips 17 composed of a nonmagnetic material such as brass or aluminum. The end plates 14 and 15 are separated and held parallel by core 20, nonmagnetic spacers 18 and a plate 29 bolted thereto.

Extending through the frame at a point near the center of the plates 14 and 15 and forming a part thereof is a stationary core piece 20 composed of magnetically permeable material. A rotatable cylindrical core or shaft 19 of magnetically permeable material is positioned in a bearing tube 20' which is located in a horizontal bore through the frame parts 16 and 20.

As shown in Fig. 2, the left-hand end of the shaft 19 has a cam 21 formed integral therewith so as to be fixedly mounted thereon. The cam 21 comprises an eccentrically mounted disk abutting the outer surface of the plate 14. The other end of the shaft 19 has a disk 22 concentrically mounted thereon and fixed in position by a set screw 23. The disk 22 has a handle 24 mounted near the perimeter thereof which serves to facilitate rotation of the disk 22, shaft 19 and cam 21.

Rotatably mounted upon the shaft 19 between the plate 15 and disk 22 is a second cam 25 which is shown in the form of an eccentric disk similar to the cam 21 except that the cam 25 is rotatable with respect to the shaft 19. A weak compression spring 27 maintains bias between the cam 25 and the disk 22. A handle 26 mounted near the periphery of the cam 25 serves as a convenient means for rotating the cam 25. The cams 21 and 25 constitute adjustable members which, as shown in Fig. 1, engage portions of the work piece to support it. The means for holding the cams in their adjusted positions will now be described.

An electromagnetic winding 30 surrounds the rotatable core 19 and stationary core 20. As shown in Fig. 3, the winding 30 is equipped with a pair of lead wires 28 which may be connected to a source (not shown) of direct current. When the winding 30 is energized, the adjustable cams 21 and 25 are magnetically clamped in their adjusted positions and as hereinafter pointed out, the support is magnetically clamped to the work piece 11 and to the table 10.

The operation of the device may best be explained with reference to Fig. 1. When it is desired to support a work piece, the cams 21 and 25 are rotated to their low points and the device is then placed on the table 10 under the portion of the work piece which it is desired to support. The cams are then rotated until their surfaces make contact with the work piece. A direct current is then run through the lead wires 28 and winding 30 to create two magnetic flux paths as shown by the arrows in Fig. 1. One flux path leads through the cores 19 and 20, a portion of the cams 21 and 25 and the work piece 11. The other flux path leads through the cores 19 and 20, another portion of the cams 21 and 25, the lower strips 16 and the machine table 10. Both flux paths attract the cams 21 and 25 to the end plates 14 and 15 thereby preventing rotation of the cams.

Machine tables are normally fabricated of steel or cast iron. Since this material is magnetically permeable the flux path which passes therethrough holds the support firmly in position under the work piece. Many work pieces are also made of magnetically permeable material and the flux path passing through the work piece helps to hold it in position. While the support works most efficiently with a magnetically permeable work piece the spacer 18 may be composed of magnetically permeable material to provide a flux return path thereby providing sufficient attraction of the cams 21 and 25 to prevent their rotation even though the work piece is not attracted by magnetic flux.

Fig. 1 also illustrates the function performed by the nonmagnetic strips 17 in the plates 14 and 15. The presence of the strips 17 increases the reluctance of the flux path through the plates 14 and 15 thereby diverting a portion of the flux outside the plates and through the cams 21 and 25.

The support or jack of this invention may be positioned in place on a machine table and the cams may be positioned in support of a work piece by not more than a half revolution thereof. With the handles 24 and 26 both projecting in the same direction as shown in Fig. 2, they may be manipulated conveniently by one hand from one side of the support to adjust the cams 21 and 25. Setting up operations take only a moment and the energization of the coil winding 30 enables the device to give firm and reliable support to a work piece.

A modified form of the invention is shown in Figs. 4 and 5 which utilizes a different type of adjustable member and mounting means therefor. In the modified form, the frame is similar to that of the previous embodiment comprising two spaced parallel end plates 41 and 42. The end plate 41 consists of three magnetic strips 41a, 41b, and 41c. These magnetic strips are separated from each other by nonmagnetic strips 41d and 41e. End plate 42 is similarly constructed of magnetic strips 42a, 42b and 42c and nonmagnetic strips 42d and 42e. Any suitable means may be employed for securing these strips together to form each end plate into a unitary whole. Between the end plates 41 and 42 is a core 45 surrounded by electromagnetic winding 46. Nonmagnetic spacers 47 and 48 adjacent to magnetic winding 46 separate and hold parallel end plates 41 and 42, while bolts 49 are utilized to tie the end plates to core 45.

For contacting the work to be supported by the magnetic jack the modified form of the invention utilizes two pivotally supported members, herein shown as cam plates 50 and 51. The cam plates 50 and 51 are substantially rectangular and are eccentrically mounted for independent rotation on the end plates 41 and 42, respectively. Bolts 52 are provided for this purpose and are threadably received in said end plates, each bolt being encircled by a compression spring 53 for normally holding the cam plates 50 and 51 against the end plates 41 and 42. Each cam plate has a cam surface 54 near the eccentric pivot point, which projects above the end plates 41 and 42. It will be seen from Fig. 4 that the bolt 52 which acts as the eccentric pivot is located near one end of the cam surface 54, while the cam surface 54 is at the right-hand end of the cam plate 51 as shown in Fig. 4. Thus the major part of cam plate 51 extends outwardly from bolt 52 to the left, as shown in Fig. 4, making the heavier portion of the cam plate 51 located on the left of bolt 52 in Fig. 4. Because of this location of the pivot point, cam plate 51 will normally be urged by gravity into rotation in a counterclockwise direction (as seen in Fig. 4), thus moving cam surface 54 upwardly and into position to support the work.

In the operation of this modified form, the bolts 52 act as eccentric pivot points for the cam plates, as previously described. Because of the fact that the pivot points are located away from the center of gravity of the cam plates, the plates are normally caused to rotate into work supporting position by gravity. The cam plates 50 and 51 are thus self-adjusting and require no manual setting to place them into work supporting position. When in position, energization of the magnetic winding 46 through lead wires 55 establishes lines of force through the frame and cam plates in a manner similar to that previously described, thus locking the cam plates 50 and 51 into work supporting position, and the parallel end plates 41 and 42 to the work table.

I claim:

1. A magnetic work support comprising a pair of spaced parallel plates, each of said plates being composed of three strips of magnetically permeable material separated by strips of non-magnetic material, said non-magnetic strips serving to direct lines of magnetic flux outside said plates, means for fixedly maintaining said plates in parallel spaced relation, a core of magnetically permeable material extending between said plates at a point near the center thereof, a winding disposed about said core in the space between said plates, a rotatable shaft extending through the core and plates, a first cam of magnetically permeable material fixedly mounted near one end of said shaft outside of said plates, a second cam of magnetically permeable material rotatably mounted outside of said plates on said shaft near the other end thereof, said cams being of a size to extend beyond said plates various distances depending on the rotative position of the cams and to extend across said strips of non-magnetic material in all rotative positions of the cams, a handle mounted on said second cam for effecting rotation thereof, and a handle mounted on the end of said shaft for effecting rotation of said first cam, said winding being energizable to create a first magnetic flux path through said cams and upper strips to clamp the cams in adjusted positions and a second magnetic flux path through the lower strips of said plates whereby said support may be maintained in position on a machine table composed of magnetically permeable material.

2. A magnetic work support comprising a pair of spaced parallel plates composed in part of magnetically permeable material separated by strips of non-magnetic material, a core of magnetically permeable material extending through said plates at a point near but away from the center thereof, a winding disposed about said core in the space between said plates, and a circular magnetic disk of a diameter substantially equal to the height of said plates eccentrically rotatably mounted on said core outside of one of said plates, said strips of non-magnetic material positioned in said one plate so as to be opposite a portion of said circular disk in all rotative positions of said disk, said disk being rotatable when said winding is de-energized and said winding being energizable to create a magnetic flux path through said disk and clamp it against rotation.

3. A magnetic work support for use with a machine table composed of magnetically permeable material comprising a pair of spaced parallel plates, each of said plates being composed of strips of magnetically permeable material separated by strips of non-magnetic material, said non-magnetic strips serving to direct lines of magnetic flux outside said plates, means for fixedly maintaining said plates in parallel spaced relation, a core of magnetically permeable material extending between said plates at a point near the center thereof, a winding disposed about said core in the space between said plates, a rotatable magnetizable cam mounted adjacent the outside of one of said plates, said cam being of a size and shape so as to extend beyond the plates in different rotative positions of the cam and, at all times, extend across said strips of non-magnetic material, and means passing through said one plate for rotatably mounting said cam, said winding being energizable to create a first magnetic flux path through said cam whereby its rotation is prevented and a second magnetic flux path through a base portion of said plates whereby said support is adapted to be clamped to the machine table.

4. A magnetic work support comprising a pair of spaced parallel plates, each of said plates being composed of strips of magnetically permeable material separated by strips of non-magnetic material, said non-magnetic strips serving to direct lines of magnetic flux outside said plates, means for fixedly maintaining said plates in parallel spaced relation, a rotatable core of magnetically permeable material extending through said plates at a point near but slightly away from the center thereof, a winding disposed about said core in the space between said plates, a first concentric cam fixedly mounted near one end of said core outside of said plates, a second concentric cam rotatably mounted outside of said plates on said core near the other end thereof, said cams being composed of magnetically permeable material and of a diameter approximately equal to the height of said plates, a handle mounted on said second cam for effecting rotation thereof, a concentric disk fixedly mounted on the end of said core extending through said second cam, and a turning handle positioned away from the center of said disk, for effecting rotation of said disk, core, and first cam, said winding being energizable to create a first magnetic flux path through said cams whereby their rotation is prevented and a second magnetic flux path through a base portion of said plates whereby said support is maintained in position on a machine table composed of magnetically permeable material.

5. A magnetic work support comprising a pair of spaced parallel plates composed in part of magnetically permeable material separated by strips of non-magnetic material, a core of magnetically permeable material extending between said plates at a point near the center thereof, a winding disposed about said core in the space between said plates, a pivot pin secured to each of said plates and projecting outwardly therefrom, a pair of magnetic cam plates generally coextensive with said plates each having a cam surface thereon remote from the center of gravity of said cam plate and of a size to extend beyond said plates when moved into work supporting position, and each being rotatably connected to one of said pivot pins at a point near said cam surface, whereby said cam surfaces are normally urged by gravity to rotate into work supporting position, said strips of non-magnetic material positioned in said plates so as to be opposite a portion of said cam plates in all rotative positions of said cam plates and said winding being energizable to create a first magnetic flux path through said cam plates whereby their rotation is prevented and a second magnetic flux path through the lower portion of said parallel plates whereby said support may be maintained in position on a machine table composed of magnetically permeable material.

References Cited in the file of this patent
UNITED STATES PATENTS

| 651,908 | Walker | June 19, 1900 |

FOREIGN PATENTS

| 23,016 of 1905 | Great Britain | Nov. 8, 1906 |
| 606,953 | Great Britain | Aug. 23, 1948 |